United States Patent
Moosbrucker

[11] 4,033,628
[45] July 5, 1977

[54] PARTICULATE MATERIAL CONVEYING ARRANGEMENT

[75] Inventor: Karl Moosbrucker, Saulgau, Wurttemburg, Germany

[73] Assignee: Josef Bautz GmbH, Saulgau, Wurttemberg, Germany

[22] Filed: Oct. 14, 1975

[21] Appl. No.: 621,659

[30] Foreign Application Priority Data
Oct. 16, 1974 Germany ..................... 2449152

[52] U.S. Cl. ............................. 302/34; 302/38; 302/61
[51] Int. Cl.² ................................. B65G 53/40
[58] Field of Search .......... 302/8, 34, 37, 38, 60, 302/61; 74/89.13, 417, 423, 799, 710; 37/43 R; 56/13.3, 13.4

[56] References Cited

UNITED STATES PATENTS

| 702,766 | 6/1902 | Bartholomew | 302/8 |
|---|---|---|---|
| 2,666,342 | 1/1954 | Bell | 74/710 |
| 2,916,330 | 12/1959 | Dumanowski | 302/34 |
| 3,075,813 | 1/1963 | Vohl | 302/61 |
| 3,241,253 | 3/1966 | McKee | 37/43 R |
| 3,251,631 | 5/1966 | Hennen | 302/34 |
| 3,268,268 | 8/1966 | Schwalm | 302/61 |
| 3,427,900 | 2/1969 | Walker | 74/710 |
| 3,726,029 | 4/1973 | Deen et al. | 302/34 |
| 3,742,626 | 7/1973 | Ellis | 302/34 |
| 3,832,006 | 8/1974 | Johnson | 302/60 |
| 3,867,773 | 2/1975 | Gunderson | 37/43 R |
| 3,879,866 | 4/1975 | Gunderson | 37/43 R |

Primary Examiner—Evon C. Blunk
Assistant Examiner—Jeffrey V. Nase
Attorney, Agent, or Firm—Michael J. Striker

[57] ABSTRACT

A spout of an agricultural ejector is mounted on the ejector housing for angular displacement about an axis. An planetary gear transmission is interposed between the spout and the housing and has one bevel gear stationarily connected to the housing and another bevel gear connected to the spout for rotation therewith. A bevel pinion is mounted on a sleeve for rotation about its own axis and for orbiting about the axis of the spout in meshing engagement with the bevel gears. A cylinder and piston unit is pivotably connected to the housing and to the sleeve and rotates the sleeve so that the planetary gear transmission causes the spout to rotate at twice the angular speed of the sleeve. In this manner, the direction in which the spout ejects can be rapidly changed.

9 Claims, 2 Drawing Figures

PARTICULATE MATERIAL CONVEYING ARRANGEMENT

BACKGROUND OF THE INVENTION

The present invention relates to a device for conveying particulate material entrained in a stream of gaseous medium, and more particularly to an agricultural ejector. Even more particularly, the present invention relates to an arrangement for rotating the spout of the agricultural ejector. There are already known various constructions of agricultural ejectors which are used in ejecting grain or chaff or similar particulate material entrained in a stream of air. Generally speaking, they include a housing and a spout which is mounted on the housing and has a free end portion which points in a desired direction. The particulate material entrained in the stream of air is advanced from the housing through the spout and out of the free end portion thereof in the desired direction. Such agricultural ejectors may find use with the various agricultural machines, such as threshers, forage harvesters, cutters or the like. The particular dimensions and construction of the housing and of the spout will depend on the type of the machine with which the ejector is used and on the type of particulate material which is to be ejected from the housing.

In many instances, it is necessary to change the direction in which the particulate material is ejected. This may be necessary in order to, for instance, properly load grain, chaff or similar particulate material into a container, or to properly utilize available storage space.

The prior art has already recognized the need for changing the direction in which the spout discharges the particulate material, and has proposed several arrangements for rotatably mounting the spout on the housing. So, for instance, the device disclosed in the U.S. Pat. No. 3,341,929 utilizes a worm gear transmission which includes a worm wheel connected to the spout for shared rotation therewith, and a worm which is supported on a discharge conduit of the housing for rotation about its axis in meshing engagement with the worm wheel. A crank is connected to the worm and is used for manually rotating the worm so as to angularly displace the worm wheel and thereby the spout.

The arrangement of the worm gear transmission on the discharge conduit of the housing and on the spout, respectively, enables the operator of the ejector or of the machine to which it is connected to rotate the spout at least through 180°. However, this device has the drawback that the manually operated crank must be rotated several times even for a relatively small angular displacement of the spout about its axis so that this device is unsuitable for utilization in ejectors in which the direction of discharge of the particulate material must be accomplished rather rapidly and through large angles such as, up to 180°. The need for rotating the spout through 180° rather suddenly may arise, for instance, in forage harvesters in order to switch the discharge of the grain from a full receptacle to an empty one without any significant loss of the grain or interruption in the operation of the harvester. It will be appreciated that the above-discussed device does not lend itself for rapid change in the direction of discharge and thus cannot be used for this or similar applications. Thus, this device does not satisfy the requirements needed for the utilization of this device in high-ouput forage harvesters and similar devices.

There is also already known a different device of this type in which a spout of an ejector used in a self-propelled forage harvester is mounted on the discharge conduit of the ejector for rotation about its axis. In this device, a rack-and-pinion transmission is utilized, including a gear wheel mounted on the spout for shared rotation therewith, and a toothed rack mounted on the housing or the discharge conduit thereof for displacement longitudinally of itself in meshing engagement with the gear wheel of the spout. A hydraulic cylinder-and-piston unit is used to displace the rack, whereby the spout is rotated about its axis.

When this device is compared with that previously discussed, it can be observed that the rotation of the spout about its axis can be achieved much more rapidly in this device, even if the angular displacement of the spout amounts of 180° or more. On the other hand, however, this conventional device is also disadvantageous in many respects. So, for instance, the transmission has considerable dimensions, thus taking up a considerable amount of space, which may be at premium in some instances, is rather robust and aesthetically unpleasing, and also expensive in terms of material and labor. This is primarily caused by the fact that the gear wheel of this rack-and-pinion transmission is arranged at the outer circumference of the spout which itself has considerable dimensions, particularly a substantial diameter, which necessitates the provision of the gear wheel of an even larger diameter. When the spout is to be rotated through 180° about its axis, the toothed rack and the displaceable member of the cylinder-and-piston unit must be displaced by a distance corresponding to half the circumference of the gear wheel, that is through a rather considerable distance. As a result of this, the drive of this arrangement has many parts which are spaced a substantial distance from the spout, which is a very undesirable situation that may result even in a danger to the operating personnel.

SUMMARY OF THE INVENTION

It is a general object of the present invention to avoid the disadvantages of the prior art.

More particularly, it is an object of the present invention to provide a device for ejecting particulate material entrained in a stream of a gaseous medium with a spout which can be rapidly rotated about its axis.

It is a further object of the present invention to provide an arrangement for rotating the spout about its axis, which arrangement is simple and reliable.

It is a concomitant object of the present invention to provide a gear transmission between the spout and the housing of the ejector which renders it possible to rapidly rotate the spout about its axis.

It is yet another object of the present invention to so construct the transmission that rotating one member of the transmission at a selected speed will result in rotation of the spout about its axis at a greater angular speed.

In pursuance of these objects and others which will become apparent hereafter, one feature of the present invention resides, in a device for conveying particulate material entrained in a stream of a gaseous medium, particularly in an agricultural ejector, in a combination which comprises a housing having an interior; an elongated tubular conveying element which has one end portion having a longitudinal axis and another end portion spaced from said one end portion and facing in a lateral direction relative to the axis; means for mounting the conveying element on the housing for angular displacement about the axis to thereby select the direction and including an planetary gear transmission interposed between the housing and the conveying element, and drive means for actuating the transmission; and means for advancing the gaseous medium with the particulate material entrained therein from the interior of the housing through the conveying element and out of the other end portion thereof in a selected direction.

In a currently preferred embodiment of the present invention, the gear transmission includes two gear wheels, one stationarily mounted on the housing of the discharge conduit thereof, and the other being rigidly connected to the conveying element or spout for shared rotation therewith about the axis. A gear pinion is interposed between the two gear wheels and meshes therewith while it orbits about the axis of the spout. The gear pinion may be mounted on a sleeve-shaped carrier for rotation about its own axis and for shared rotation with the sleeve about the axis of the spout. The sleeve may also surround and connect the adjacent ends of the discharge conduit and of the spout so as to prevent axial displacement of the spout relative to the discharge conduit.

The sleeve may be rotated about the axis by means of a hydraulic cylinder-and-piston unit pivoted at one of its ends at the housing and at the other end at the sleeve. It is currently preferred that the planetary gear transmission include two bevel gears, each rigidly connected to one end of said discharge conduit and said spout and both surrounded by the sleeve. The two gear wheels may be of identical dimensions and have identical number of teeth, and a bevel pinion may be mounted on the sleeve for rotation about its own axis and mesh with the two bevel gears. Of course, more than one pinion may also be provided when it is desired to achieve greater stability of the spout on the housing. In this embodiment, due to the construction and arrangement of the planetary gear transmission between the discharge conduit of the housing and the spout, it is achieved that the speed of angular displacement of the spout or the angular displacement thereof, is twice the angular displacement speed or angular displacement of the sleeve-shaped carrier which supports the pinion interposed between the two gear wheels. This, in turn, results in corresponding reduction of the speed of displacement or the extent of displacement of the displaceable member of the hydraulic cylinder-and-piston unit which is pivoted to the sleeve-shaped carrier and rotates the same.

When the planetary gear transmission according to the present invention is utilized for rotatably connecting the spout to the discharge conduit of the housing of the agricultural machine, the result is a very compact and thus space and expense saving construction of the device which is capable of rotating the spout at much higher speeds than heretofore possible. This is due to the fact that, in order to rotate the spout through 180°, it is only necessary to displace the displaceable member of the cylinder-and-piston unit to an extent corresponding to the rotation of the sleeve-shaped carrier of the gear pinion through approximately 90°.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DISCUSSION OF THE PREFERRED EMBODIMENTS

Figure 1:
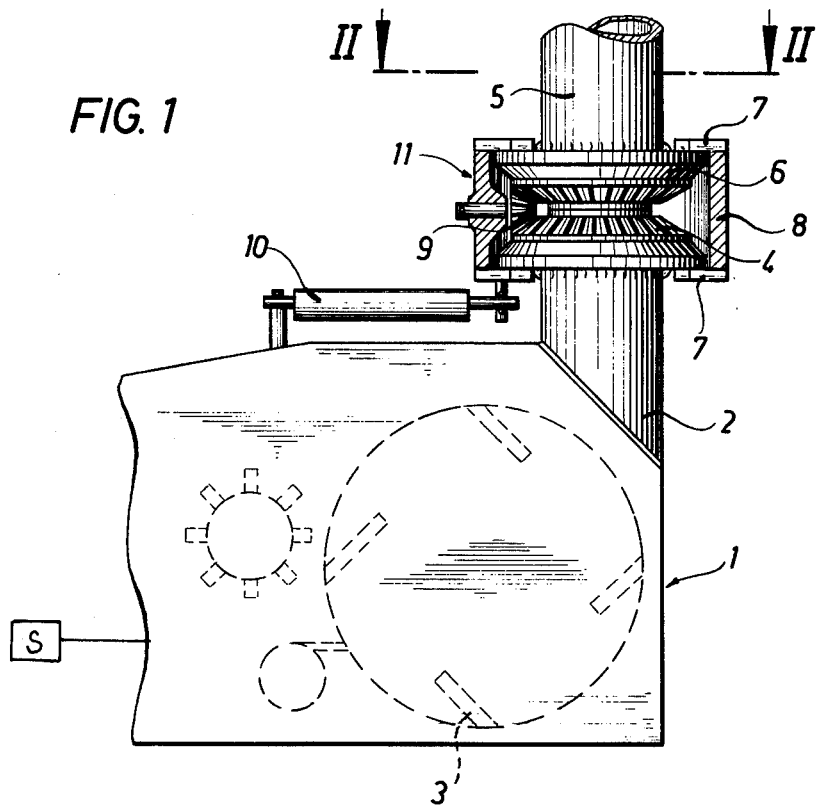
FIG. 1 is a partly sectioned fragmentary and somewhat diagrammatic side elevational view of the device according to the present invention.
Figure 2:
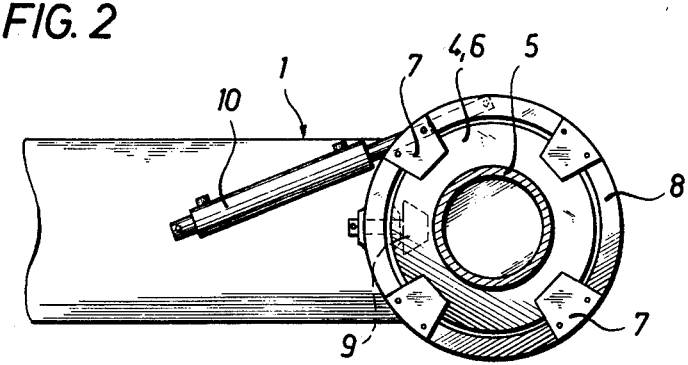
FIG. 2 is a cross-sectional view taken on line X—X of FIG. 1.

The device of the present invention will now be described as utilized in connection with a forage harvester; however, it will be understood that a similar concept may also be utilized in connection with other devices for conveying particulate material entrained in a stream of a gaseous medium.

Referring now to the drawings, it may be seen that the reference numeral 1 has been used to designate a housing of an agricultural forage harvester, the housing having a discharge conduit 2 for the discharge of the crop cut by cutters 3. The details of the forage harvester itself are well known so that they do not necessitate any further discussion or more detailed illustration in the drawing.

A bevel gear wheel 4 is rigidly connected to the free end of the discharge conduit 2, and a similar bevel gear wheel 6 is rotatably supported at the surface of the bevel gear wheel 4 which faces away from the housing 1 and is rigidly connected with the adjacent end of a conveying element or spout 5. The surfaces of the bevel gear wheels 4 and 6 which face away from one another are contacted by lugs 7 which are connected to a sleeve 8 surrounding the bevel gear wheels 4 and 6 at their outer circumferences and with radial spacing therefrom. As a result of this arrangement of the sleeve 8 with its lugs 7, the bevel gear wheel 6 of the spout 5 is mounted on the bevel gear wheel 4 of the discharge conduit 2 for rotation relative thereto about their common axis which is identical with the common axis of the discharge conduit 2 and the spout 5; in addition thereto, the sleeve 8 with its lugs 7 centers the bevel gear wheels 4 and 6 relative to one another, and prevents axial displacement of the spout 5 and of the bevel gear wheel 6 away from the bevel gear wheel 4. At least one bevel gear pinion 9 is mounted on the sleeve 8 interiorly thereof for rotation about its own axis, which bevel gear pinion 9 meshingly engages the bevel gear wheels 4 and 6 associated with the discharge conduit 2 and the spout 5, respectively. A hydraulic cylinder-and-piston unit 10 is supported at the housing 1 of the forage harvester at one of its ends, while the other end of the hydraulic cylinder-and-piston unit 10 is connected to the sleeve 8. The cylinder-and-piston unit 10 can be remotely controlled, for example, from the cabin of the forage harvester.

The present invention being directed to an arrangement for rotating the spout 5 about its axis so as to change the direction of discharge of the particulate material from the spout 5, it is not deemed necessary to discuss in any detail the various elements accommodated in the housing 1. These elements are entirely conventional and may include, as well known to those skilled in the art of constructing agricultural machines, cutting, threshing and similar devices for obtaining the particulate material to be ejected from the housing 1 through the discharge conduit 2 and the spout 5. It is sufficient for understanding the present invention to mention that a source of a pressurized gaseous medium, such as air, which is designated in the drawing as S, communicates with the interior of the housing 1 in such a manner as to entrain the particulate material and to convey it toward and through the discharge conduit 2. The spout 5 may also be of various configurations depending on the distances to be spanned and on any other particular structural and functional requirements; such spouts are also well known in the art so that only the lower end portion of the spout 5 has been illustrated in the drawing.

The device according to the present invention operates as follows:

The source S which in the present example is realized by a rotating drum with cutters 3, drives the gaseous medium with the chopped material entrained therein from the interior of the housing 1 through the discharge conduit 2 and the spout or conveying element 5 and out of the free end portion of the spout in a given direction. When the direction of discharge of the gaseous medium with the particulate material entrained therein is to be gradually or suddenly changed, the hydraulic cylinder-and-piston unit 10 is energized, which results in rotation of the sleeve 8 about the aforementioned axis. When this happens, the bevel gear pinion 9 is brought into rotation about its axis as a result of its engagement with the stationary bevel gear wheel 4 of the discharge conduit 2, and thus drives the bevel gear wheel 6 into rotation about the axis whereby the spout 5 which is rigidly connected to the bevel gear wheel 6 is rotated at the same angular speed as the latter. As the result of the fact that the bevel gear wheel 4 is stationary and that the sleeve 8 is rotated, the speed and extent of angular displacement of the spout 5 are approximately double the speed and extent of angular displacement of the sleeve 8. The fact that the angular displacement of the sleeve 8 is about one-half of the angular displacement of the spout 5 reflects itself analogously on the extent of displacement of the movable member of the hydraulic cylinder-and-piston unit 10 which rotates the sleeve 8. Thus, when the angular displacement of the spout 5 is to amount to 180°, the movable member of the hydraulic cylinder-and-piston unit 10 needs only to correspond to the angle of rotation of the sleeve 8 through approximately 90°, whereby the hydraulic cylinder-and-piston unit 10 may be made of much smaller dimensions than heretofore known. It will be understood that each of the elements described above, or two or more together may also find a useful application in other types of agricultural ejector constructions or similar devices for conveying particulate material differing from the type described above.

While the invention has been illustrated and described as embodied in a device for conveying particulate material entrained in gaseous medium, it is not intended to be limited to the details shown, since various modifications and structural changes may be made without departing in any way from the spirit of the present invention. So, for instance, the planetary gear transmission may include a sun gear, a crown gear and a pinion interposed between and meshing with the sun gear and the crown gear, respectively.

Without further anaylsis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for conveying particulate material entrained in a stream of a gaseous medium, particularly in an agricultural ejector, a combination comprising a housing having an interior; an elongated tubular conveying element having one end portion having a longitudinal axis and another end portion spaced from said one end portion and facing in a lateral direction relative to said axis; means for mounting said conveying element on said housing for angular displacement about said axis to thereby select said direction and including a planetary gear transmission including a first gear stationarily mounted on said housing, a second gear connected to said one end portion of said conveying element for sharing said angular displacement thereof, and at least one third gear meshing with said first and second gears and orbiting about said axis, said gear transmission being interposed between said housing and said conveying element; drive means for actuating said transmission; and means for advancing the gaseous medium with the particulate material entrained therein from said interior of said housing through said conveying element and out of said other end portion thereof in a selected direction.

2. A device as defined in claim 1, wherein said housing has a discharge conduit; and wherein said planetary gear transmission is interposed between said discharge conduit and said one end portion of said conveying element.

3. A device as defined in claim 1, wherein said drive means includes a carrier element mounted on said housing for rotation about said axis, and a drive mounted on said housing and connected to said carrier element for rotating the latter about said axis; and wherein said third gear has an axis and is mounted on said carrier element for shared rotation therewith and for turning about its own axis.

4. A device as defined in claim 3, wherein said drive is a hydraulic cylinder-and-piston unit pivoted to said housing and to said carrier.

5. A device as defined in claim 3, wherein said drive is a cylinder-and-piston unit having one member mounted on said housing, and another member displaceable relative to said one member and connected to said carrier element, whereby the displacement of said other member results in rotation of said carrier element with said third gear about said axis, and thereby in angular displacement of said second gear and of said conveying element about said axis.

6. A device as defined in claim 3, wherein said first and second gears are coaxial with said one end portion of said conveying element.

7. A device as defined in claim 3, wherein said first and second gears are bevel gears; wherein said third gear is a bevel pinion; and wherein said carrier element is a sleeve circumferentially surrounding said gear transmission.

8. A device as defined in claim 7, wherein said first and second gears have the same number of teeth so that rotation of said sleeve about said axis at a selected angular speed results in rotation of said second gear at twice said selected angular speed.

9. A device as defined in claim 7, wherein said sleeve has portions which extend substantially radially inwardly of said sleeve and engage behind said first and second gears to thereby prevent axial displacement thereof away from one another.

* * * * *